(12) United States Patent
Fabick et al.

(10) Patent No.: US 12,332,466 B2
(45) Date of Patent: Jun. 17, 2025

(54) OPTICAL FILM (71) Applicant: 3M INNOVATIVE PROPERTIES COMPANY, St. Paul, MN (US)

(72) Inventors: Ryan T. Fabick, Shoreview, MN (US); Matthew E. Sousa, Rosemount, MN (US); William B. Black, Eagan, MN (US); Edward J. Kivel, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 918 days.

(21) Appl. No.: 17/274,309

(22) PCT Filed: Sep. 13, 2019

(86) PCT No.: PCT/IB2019/057744
§ 371 (c)(1),
(2) Date: Mar. 8, 2021

(87) PCT Pub. No.: WO2020/053832
PCT Pub. Date: Mar. 19, 2020

(65) Prior Publication Data
US 2021/0333455 A1 Oct. 28, 2021

Related U.S. Application Data

(60) Provisional application No. 62/731,325, filed on Sep. 14, 2018.

(51) Int. Cl.
*G02B 5/28* (2006.01)
(52) U.S. Cl.
CPC ............. *G02B 5/287* (2013.01); *G02B 5/282* (2013.01)

(58) Field of Classification Search
CPC ........ G02B 5/287; G02B 5/282; G02B 5/285; G02B 5/28; G02B 5/281
See application file for complete search history.

(56) References Cited

U.S. PATENT DOCUMENTS

| 5,882,774 A | 3/1999 | Jonza |
| 5,976,424 A | 11/1999 | Weber |

(Continued)

FOREIGN PATENT DOCUMENTS

| JP | H09251105 | 9/1997 |
| JP | 2000-314807 | 11/2000 |

(Continued)

OTHER PUBLICATIONS

English machine translation of JP 2000314807 A, generated May 2, 2024 (Year: 2000).*

(Continued)

*Primary Examiner* — Stephone B Allen
*Assistant Examiner* — Adam W Booher
(74) *Attorney, Agent, or Firm* — Clifton F. Richardson (57) ABSTRACT

An optical film including a plurality of alternating first and second layers disposed on a skin layer is described. The skin layer has an average thickness greater than about 2 microns. A transmittance of the film for substantially normally incident light includes a band edge separating first and second wavelength ranges, where each range is at least 250 nm wide. A reflectance of the film is greater than about 95% for each wavelength in the first wavelength range; an average transmittance of the film is greater than about 80% in the second wavelength range; and a difference between maximum and minimum values of the optical transmittance of the film in the second wavelength range is less than about 30%. The band edge may have a slope that is greater than about 2%/nm. The transmittance may increase monotonically at (Continued)

least from about 10% to about 70% with increasing wavelength.

10 Claims, 9 Drawing Sheets

(56) References Cited

U.S. PATENT DOCUMENTS

| | | | |
|---|---|---|---|
| 6,157,490 | A | 12/2000 | Wheatley |
| 6,179,948 | B1 | 1/2001 | Merrill |
| 6,783,349 | B2 | 8/2004 | Neavin |
| 7,851,054 | B2 | 12/2010 | Weber |
| 10,948,644 | B2 | 3/2021 | Nevitt |
| 2001/0013668 | A1 | 8/2001 | Neavin |
| 2002/0015836 | A1 | 2/2002 | Jonza |
| 2011/0255167 | A1* | 10/2011 | Merrill ................. G02B 5/3041 204/157.15 |
| 2011/0272849 | A1 | 11/2011 | Neavin |
| 2013/0059080 | A1 | 3/2013 | Bay |
| 2015/0192717 | A1 | 7/2015 | Katagiri et al. |
| 2016/0238762 | A1 | 8/2016 | Nevitt |
| 2023/0266515 | A1* | 8/2023 | Long ....................... G02B 5/285 359/580 |

FOREIGN PATENT DOCUMENTS

| | | |
|---|---|---|
| KR | 20180097178 A | 8/2018 |
| KR | 20180097757 A | 8/2018 |
| WO | 2017106096 A1 | 6/2017 |
| WO | 2017127734 A1 | 7/2017 |
| WO | 2017213911 A1 | 12/2017 |
| WO | 2018129076 A1 | 7/2018 |

OTHER PUBLICATIONS

Optical Transmittance for Optical Film Having Fourth or Higher Order Visible Reflection Bands, the optical film was sold by 3M Company prior to Sep. 14, 2017, 1 page.
International Search report for PCT International Application No. PCT/IB2019/057744 mailed on Feb. 13, 2020, 6 pages.
Optical manual, Lijingzhen, p. 1307-1309, Shaanxi science and Technology Press, Jul. 2010, 6 pages.

* cited by examiner

OPTICAL FILM

BACKGROUND

Optical films are used in a variety of display applications. For example, a mirror film can be used in a backlight unit of a liquid crystal display panel for light recycling.

SUMMARY

In some aspects of the present description, an optical film including a plurality of alternating polymeric first and second layers disposed on a skin layer is provided. Each of the first and second layers has an average thickness less than about 250 nm. The skin layer has an average thickness greater than about 2 microns. The first and second layers and the skin layer are formed integrally with one another. An optical transmittance of the optical film for substantially normally incident light has a band edge separating first and second wavelength ranges, where the first wavelength range extends at least from about 400 nm to about 700 nm, and the second wavelength range extends at least from about 950 nm to about 1300 nm. For substantially normally incident light in air: an optical reflectance of the optical film is greater than about 95% for each wavelength in the first wavelength range; an average optical transmittance of the optical film is greater than about 80% in the second wavelength range; and a difference between maximum and minimum values of the optical transmittance of the optical film in the second wavelength range is less than about 25%. A best linear fit to the band edge correlating the optical transmittance to wavelength at least across a wavelength range where the optical transmittance increases from about 10% to about 70% has a slope that is greater than about 2%/nm.

In some aspects of the present description, an optical film including a plurality of alternating polymeric first and second layers numbering between 50 and 800 is provided. Each first and second layer has an average thickness less than about 500 nm. An optical transmittance of the optical film for substantially normally incident light has a band edge region separating first and second wavelength ranges, where each range is at least 250 nm wide. A difference between maximum and minimum values of the optical transmittance of the optical film in each wavelength range is less than about 30%. In planes of the first and second layers, the first and second layers have respective indices of refraction: $n1x$ and $n2x$ along a first polarization state, $n1y$ and $n2y$ along a second polarization state orthogonal to the first polarization state, and $n1z$ and $n2z$ along a z-axis orthogonal to the first and second polarization states. For at least one wavelength in at least one of the first and second wavelength ranges: each of $n1x$ and $n1y$ is greater than $n1z$ by at least 0.2; a difference between $n1x$ and $n1y$ is less than about 0.04; a maximum difference between $n2x$, $n2y$ and $n2z$ is less than about 0.01; and a difference between $n1x$ and $n2x$ is greater than about 0.2. The optical transmittance of the optical film for substantially normally incident light within the band edge region increases monotonically at least from about 10% to about 70% with increasing wavelength.

In some aspects of the present description, a display including a display panel for displaying a visible image to a viewer in a first wavelength range extending at least from about 400 nm to about 700 nm, an infrared light source for emitting light at an infrared wavelength greater than the first wavelength range through the display panel toward the viewer; and a mirror film disposed between the display panel and the infrared light source is provided. For substantially normally incident light and for each of orthogonal first and second polarization states: for each wavelength in the first wavelength range, the mirror film reflects at least 90% of light; at the infrared wavelength, the mirror film transmits at least 70% of light; and at a first wavelength disposed between the first wavelength range and the infrared wavelength, the mirror film transmits between 40% and 60% of light. The first wavelength is within about 50 nm of the infrared wavelength.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some displays, a mirror film, such as an Enhanced Specular Reflector (ESR) film (available from 3M Company, St. Paul, MN), is placed below (opposite the light output side) a liquid crystal display (LCD) panel in a recycling backlight unit. In some applications, a display includes one or more sensors. For example, smartphones may include one or more of a proximity sensor, an ambient light sensor, or a fingerprint sensor. Such sensors have traditionally been located outside the active area of the display. To reduce the bezel around the display, it may be desired to include one or more sensors located in the active area of the display. The sensors are then preferably disposed below the mirror film. In some cases, it is desired to include an infrared (IR) light source below the mirror film. For example, a fingerprint sensor may include an infrared light source emitting an infrared light through the display panel and may include a sensor to receive the infrared light after it has been reflected back through the display panel from a finger, for example. For the light source and/or sensor to work as desired, the mirror film preferably has a substantial transmittance (e.g., at least 70%) for light at the wavelength where the light source and/or sensor is adapted to function. Typically for IR light sources and sensors, this wavelength is 850 nm or 940 nm. Currently the mirror film used in smartphones and other consumer electronics displays do not transmit light at these wavelengths.

In some embodiments of the present description, an optical film or mirror film that is reflective up to a band edge in the near infrared and is transmissive at longer wavelengths is provided. The band edge may have a large (e.g., greater than about 2%/nm) slope. This may be desirable so that the optical film provides recycling throughout the visible range even for obliquely incident light (at least up to some desired angle of incidence) and is transmissive at an infrared wavelength close to the band edge where a light source/sensor operates. This infrared wavelength may be within about 50 nm of the band edge, for example. The optical films of the present description are also useful in automotive display applications where IR light source(s) are included in a display behind a mirror film of the display to provide IR illumination to the cabin of the automobile, for example.

Multilayer optical films having reflection bands with sharp band edges are described in U.S. Pat. No. 6,157,490 (Wheatley et al.), for example. In some cases, the band sharpening techniques described in this reference results in a sharp band edge slope as measured between a transmittance of 10% and a transmittance of 50%, but a band edge slope as measured between a transmittance of 10% and a transmittance of 70% can be substantially smaller due to ringing in the transmission spectra that can be present below a transmittance of 70% for band edges in the near infrared and which can result in a non-monotonic increase in the transmission between 10% and 70% resulting in a reduced band edge slope. Such ringing can be caused, at least in part, by interference with light reflected at an outermost major surface of a skin layer due to Fresnel reflection. It may also be desired to provide reduced ringing in the transmittance in the infrared transmission region. It has been found, according to some embodiments, that the ringing in the transmittance can be reduced in the infrared transmission region and can be reduced or eliminated in the band edge region in at least a range where the transmittance varies from about 10% to about 70% or higher by suitably selecting the thickness of the skin layer(s) (e.g., using a skin layer having a thickness greater than about 2 microns, according to some embodiments). Other techniques for increasing the band edge slope between transmittances of 10% and 70% or higher and/or reducing undesired ringing described herein include increasing the number of layers in the optical film having thicknesses providing reflection at wavelengths near the band edge. For example, a layer pair (optical repeat unit) in alternating first and second layer of the optical film may have a maximum optical thickness and the alternating first and second layers may include at least 20, or at least 25, or at least 30 disjoint layer pairs having an optical thickness within about 30 nm, or within about 25 nm, or within about 20 nm, or within about 15 nm, or within about 12 nm, or within about 10 nm, or within about 8 nm, or within about 7 nm, or within about 6 nm of the maximum optical thickness. Using suitable skin thicknesses and suitable layer thickness profiles can result in a monotonic increase in the transmission at least from about 10% to about 70% (e.g., from about 5% to about 80% or higher) and can result in a best linear fit to the band edge correlating the optical transmittance to wavelength at least across a wavelength range where the optical transmittance increases from about 10% to about 70% has a slope that is greater than about 2%/nm, for example.

Figure 1:
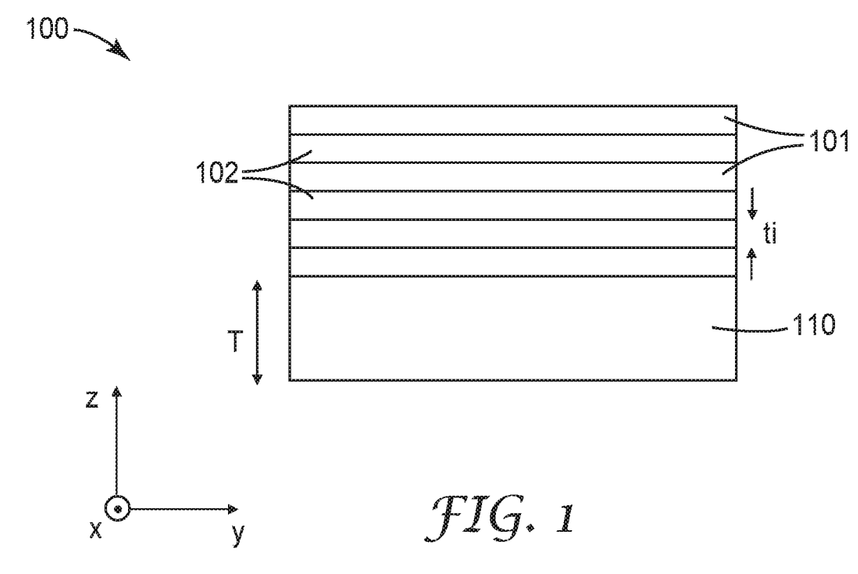
FIG. 1 is a schematic cross-sectional view of an optical film.

FIG. 1 is a schematic illustration of an optical film 100 including a plurality of alternating polymeric first and second layers 101 and 102. In the illustrated embodiment, the plurality of alternating first and second layers 101 and 102 is disposed on a skin layer 110. A second skin layer may be disposed on an opposite side of the plurality of alternating first and second layers 101 and 102. The plurality of alternating first and second layers 101 and 102 reflect and transmit light primarily by optical interference and may be referred to as optical layers or interference layers. Interference layers may be described as reflecting and transmitting light primarily by optical interference when the reflectance and transmittance of the interference layers can be reasonably described by optical interference or reasonably accurately modeled as resulting from optical interference. Adjacent pairs of interference layers having differing refractive indices reflect light by optical interference when the pair has a combined optical thickness (refractive index times physical thickness) of ½ the wavelength of the light. The refractive index used in determining the optical thickness can be a fixed reference wavelength (e.g., 532 nm or 633 nm). Interference layers typically have a physical thickness of less than about 500 nanometers, or less than about 250 nm. Skin layers typically have an optical thickness too large to reflect and transmit light primarily by optical interference and may be referred to as non-interference layers or non-optical layers or optically thick layers. However, Fresnel reflections from a major surface (e.g., the outermost major surface) of a skin layer can affect the transmission spectrum of the optical film as described further elsewhere herein.

The thicknesses of the alternating first and second layers can be selected to give a desired reflection band and a thickness profile can be selected to include a large number of layer pairs having an optical thickness corresponding to the band edge as described further elsewhere herein. An appropriate thickness of the skin layer(s) can be determined by optical modeling, for example, where the transmission spectra can be determined for a range of skin thicknesses. It has been found that a skin thickness can be chosen which results in reduced optical ringing.

The average thickness ti of the $i^{th}$ layer is indicated. In some embodiments, each of the first and second layers have an average thickness less than about 500 nm, or less than about 250 nm, or less than about 200 nm, or less than about 180 nm, or less than about 200 nm, or in a range of 20 nm to 250 nm, or in a range of 25 nm to 200 nm, or in a range of about 30 nm to about 180 nm. The average thickness refers to the unweighted average of the thickness over an area of the optical film 100. The thickness of a layer may be substantially constant (e.g., varying by no more than 10%, or no more than 5%, or no more than 3%) so that the average thickness is the substantially constant thickness of the layer. In some embodiments, the skin layer 110 has an average thickness T greater than about 2 microns, or greater than about 3 microns, or greater than about 4 microns, or greater than about 5 microns, or greater than about 6 microns, or greater than about 7 microns. In some embodiments, the skin layer 110 has a thickness of no more than about 30 microns, or no more than about 20 microns, or no more than about 15 microns, or no more than about 10 microns. In some embodiments, the skin layer 110 has an average thickness in a range of about 2 microns to about 15 microns, or in a range of about 3 microns to about 10 microns, for example. In some embodiments, the optional second skin layer is included and has an average thickness within about 20%, or within about 15%, or within about 10% of the average thickness of the skin layer 110.

As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film having each of the layers, followed by orienting the cast film) rather than manufactured separately and then subsequently joined. In some embodiments, the first and second layers 101 and 102 and the skin layer 110 are formed integrally with one another. In some embodiments, the first and second layers 101 and 102, the first skin layer 110, and an opposite second skin layer are formed integrally with one another.

In some embodiments, optical film 100 includes a plurality of alternating polymeric first and second layers 101 and 102 numbering between 50 and 800, or between 400 and 800, or between 500 and 800, inclusive. In some embodiments, the only layers in the optical film having a thickness less than about 500 nm, or less than about 250 nm, are the first and second layers 101 and 102, and a total number of the alternating polymeric first and second layers 101 and 102 is in a range of 50 to 800, or in a range of 400 to 800, or in a range of 500 to 800.

The optical films of the present description can be made using any suitable light-transmissive materials, but in many cases, it is beneficial to use low absorption polymer materials. With such materials, absorption of a microlayer stack over visible and infrared wavelengths can be made small or negligible, such that the sum of reflection and transmission for the stack (or an optical film of which it is a part), at any given wavelength and for any specified angle of incidence and polarization state, is approximately 100%, i.e., R+T≈100%, or R≈100%−T.

Suitable materials for the alternating first and second layers 101 and 102 and for the skin layer 110 include, for example, polyethylene naphthalate (PEN), copolymers containing PEN and polyesters (e.g., polyethylene terephthalate (PET) or dibenzoic acid), glycol modified polyethylene terephthalate, polycarbonate (PC), poly(methyl methacrylate) (PMMA), or blends of these classes of materials. In some embodiments, the first layers 101 comprises PEN and the second layers 102 comprises PMMA.

Exemplary optical films are composed of polymer materials and may be fabricated using coextruding, casting, and orienting processes. Methods of making such films are described in U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In some embodiments, the optical film 100 is reflective (e.g., optical reflectance greater than about 90% or greater than about 95%) in a first wavelength range (e.g., extending at least from about 430 nm to about 680 nm or at least from about 400 nm to about 700 nm). Such optical films may be described as a mirror film or a visible light mirror film. In some embodiments, the optical film 100 or the mirror film is transmissive (e.g., average optical transmittance greater than about 75% or greater than about 80%) in a second wavelength range (e.g., extending at least from about 1000 nm to about 1250 nm or at least from about 950 nm to about 1300 nm).

In some embodiments, a primary reflection band provides the reflection in the first wavelength range. A primary reflection band or first order harmonic reflection band is a reflection band where wavelengths in the reflection band are reflected by layer pairs or optical repeat units having an optical thickness of half the wavelength. The layer pairs or optical repeat units may also reflect higher order harmonics at wavelengths that are inverse integer multiples of this primary wavelength.

In some embodiments, in planes of the first and second layers 101 and 102 (parallel to the x-y plane referring to the illustrated x-y-z coordinate system), the first and second layers 101 and 102 have respective indices of refraction: n1x and n2x along a first polarization state (polarization state with electric field parallel to the x-axis), n1y and n2y along a second polarization state (polarization state with electric field parallel to the y-axis) orthogonal to the first polarization state, and n1z and n2z along a z-axis orthogonal to the first and second polarization states, such that for at least one wavelength (e.g., 532 nm or 633 nm) in at least one of the first and second wavelength ranges: each of n1x and n1y is greater than n1z by at least 0.2; a difference between n1x and n1y is less than about 0.04; a maximum difference between n2x, n2y and n2z is less than about 0.01; and a difference between n1x and n2x is greater than about 0.2. For example, in some embodiments, at a wavelength of 633 nm, n1x is about 1.737, n1y is about 1.763, n1z is about 1.496, and n2x, n2y, and n2z are each about 1.495.

Figure 2:
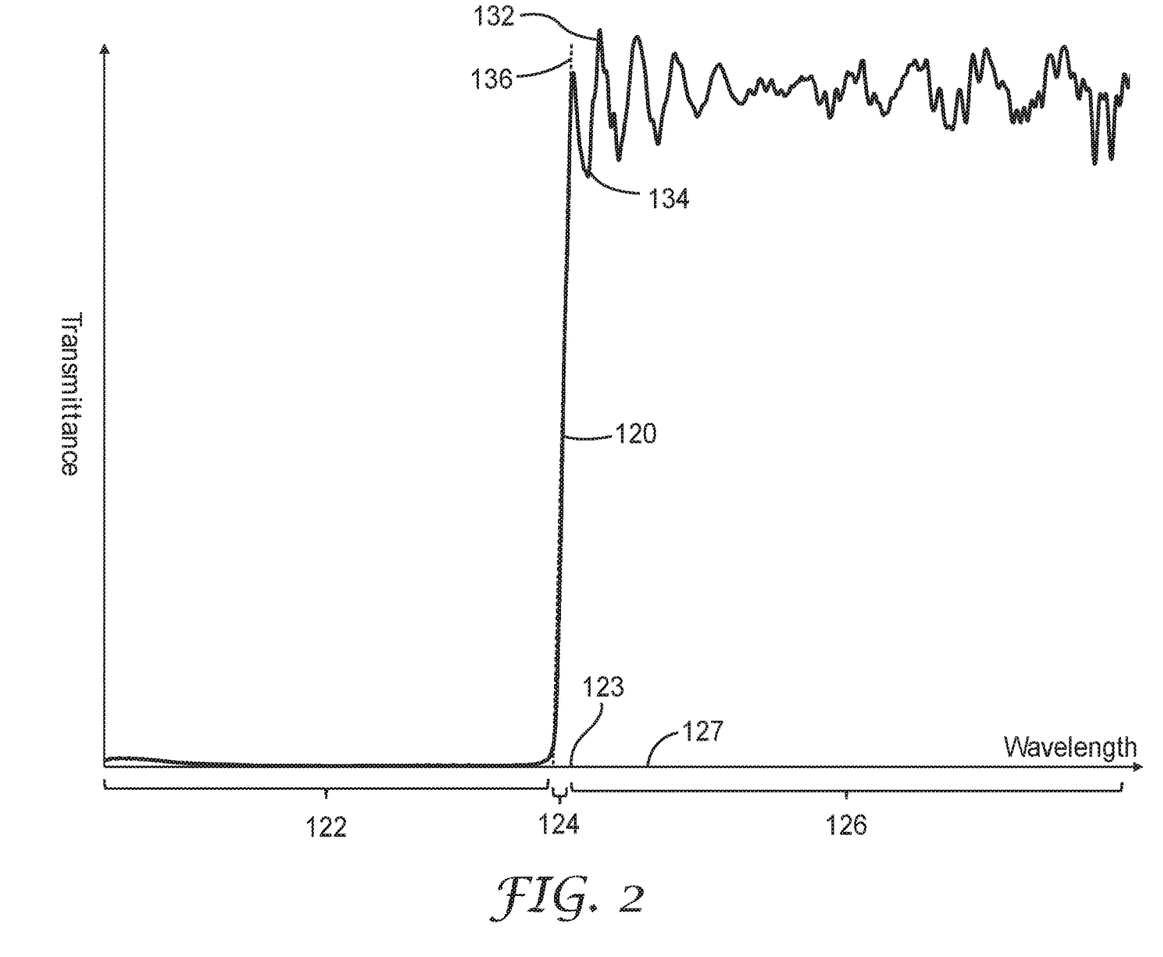
FIG. 2 is a schematic plot of an optical transmittance of an optical film versus wavelength.

FIG. 2 is a schematic plot of an optical transmittance of an optical film for substantially normally incident light. The optical transmittance of the optical film includes a band edge 120 separating first and second wavelength ranges 122 and 126. A band edge region 124 includes at least a wavelength range where the optical transmittance increases from about 10% to about 70% with increasing wavelength. In some embodiments, the optical transmittance of the optical film for substantially normally incident light within the band edge region 124 increases monotonically at least from about 10% to about 70%, or at least from about 10% to about 75%, or at least from about 10% to about 80%, or at least from about 5% to about 80% with increasing wavelength. In some embodiments, the first wavelength range 122 extends at least from about 400 nm to about 700 nm. In some embodiments, the second wavelength range 126 extends at least from about 950 nm to about 1300 nm. In some embodiments, each of the first and second wavelength ranges is at least 250 nm wide, or at least 300 nm wide. In some embodiments, the band edge region 124 is no more than 30 nm wide, or no more than 20 nm wide, or no more than 15 nm wide.

Substantially normally incident light is light sufficiently close to normally incident on the optical film that the transmittance and reflectance of substantially normally incident light differs negligibly from that of light normally incident on the optical film. Substantially normally incident light may, in some embodiments, be within 20 degrees, or within 10 degrees, or within 5 degrees of normally incident, or may be normally incident or nominally normally incident.

The transmittance of an optical element (e.g., optical film or mirror film) refers generally to the transmitted light intensity divided by the incident light intensity (for light of a given wavelength, incident direction, etc.), but may be expressed in terms of "external transmittance" or "internal transmittance". The external transmittance of an optical element is the transmittance of the optical element when immersed in air, and without making any corrections for Fresnel reflections at the air/element interface at the front of the element or for Fresnel reflections at the element/air interface at the back of the element. The internal transmittance of an optical element is the transmittance of the element when the Fresnel reflections at its front and back surfaces have been removed. The removal of the front and back Fresnel reflections may be done either computationally (e.g. by subtracting an appropriate function from the external transmission spectrum), or experimentally. For many types of polymer and glass materials, the Fresnel reflections are about 4 to 6% (for normal or near-normal angles of incidence) at each of the two outer surfaces, which results in a downward shift of about 10% for the external transmittance relative to the internal transmittance. If transmittance is referred to herein without being specified as internal or external, it may be assumed that the transmittance refers to external transmittance, unless specified otherwise or otherwise indicated by the context.

In some embodiments, for substantially normally incident light in air: an optical reflectance of the optical film is greater than about 95% (e.g., greater than 93%, or greater than 94%, or greater than 95%, or greater than 96%) for each wavelength in the first wavelength range 122; an average optical transmittance of the optical film is greater than about 80% in the second wavelength range 126; and a difference between maximum 132 and minimum 134 values of the optical transmittance of the optical film in the second wavelength range 126 is less than about 30% or less than about 25% (for example, the maximum value 132 of the optical transmittance in the second wavelength range 126 may be about 95% and the minimum value 134 may be about 75% so that the difference is about 20%). The average optical transmittance in the second wavelength range 126 is the unweighted average over wavelengths and polarization states in the second wavelength range 126.

In some embodiments, a display includes the optical film and an infrared light source adapted to emit light at an infrared wavelength 127. In some cases, it is desired that the optical film be transmissive to the infrared wavelength 127 and to be reflective for wavelengths close to (e.g., about 50 nm less than) the infrared wavelength 127. In some embodiments, at an infrared wavelength 127, the optical film transmits at least 70% of substantially normally incident light, and at a first wavelength 123 disposed between the first wavelength range 122 and the infrared wavelength 127, the optical film transmits between 40% and 60% of substantially normally incident light. In some embodiments, the first wavelength 123 is within about 60 nm, or about 50 nm, or about 40 nm, or about 30 nm, or about 20 nm of the infrared wavelength 127.

In some embodiments, a best linear fit to the band edge correlating the optical transmittance to wavelength at least across a wavelength range (e.g., band edge region 124) where the optical transmittance increases from about 10% to about 70% has a slope that is greater than about 2%/nm, or greater than about 3%/nm, or greater than about 4%/nm, or greater than about 5%/nm. A best linear fit 136 is schematically illustrated in FIG. 2. The best linear fit 136 can be determined as a linear least squares fit to the transmittance as a function of wavelengths at least across a wavelength range where the transmittance increases from about 10% to about 70% (e.g., across a wavelength range where the transmittance increases from about 10% to about 70%, or from about 10% to about 75%, or from about 10% to about 80%). In some embodiments, the best linear fit to the band edge correlating the optical transmittance to wavelength is at least across a wavelength range where the optical transmittance increases from about 10% to about 75%, or from about 10% to about 80%. In some embodiments, a best linear fit to the band edge correlating the optical transmittance to wavelength at least across a wavelength range where the optical transmittance increases from about 10% to about 75% has a slope that is greater than about 2%/nm, or greater than about 3%/nm, or greater than about 4%/nm, or greater than about 5%/nm. In some embodiments, a best linear fit to the band edge correlating the optical transmittance to wavelength at least across a wavelength range where the optical transmittance increases from about 10% to about 80% has a slope that is greater than about 2%/nm, or greater than about 3%/nm, or greater than about 4%/nm, or greater than about 5%/nm.

Figure 3:
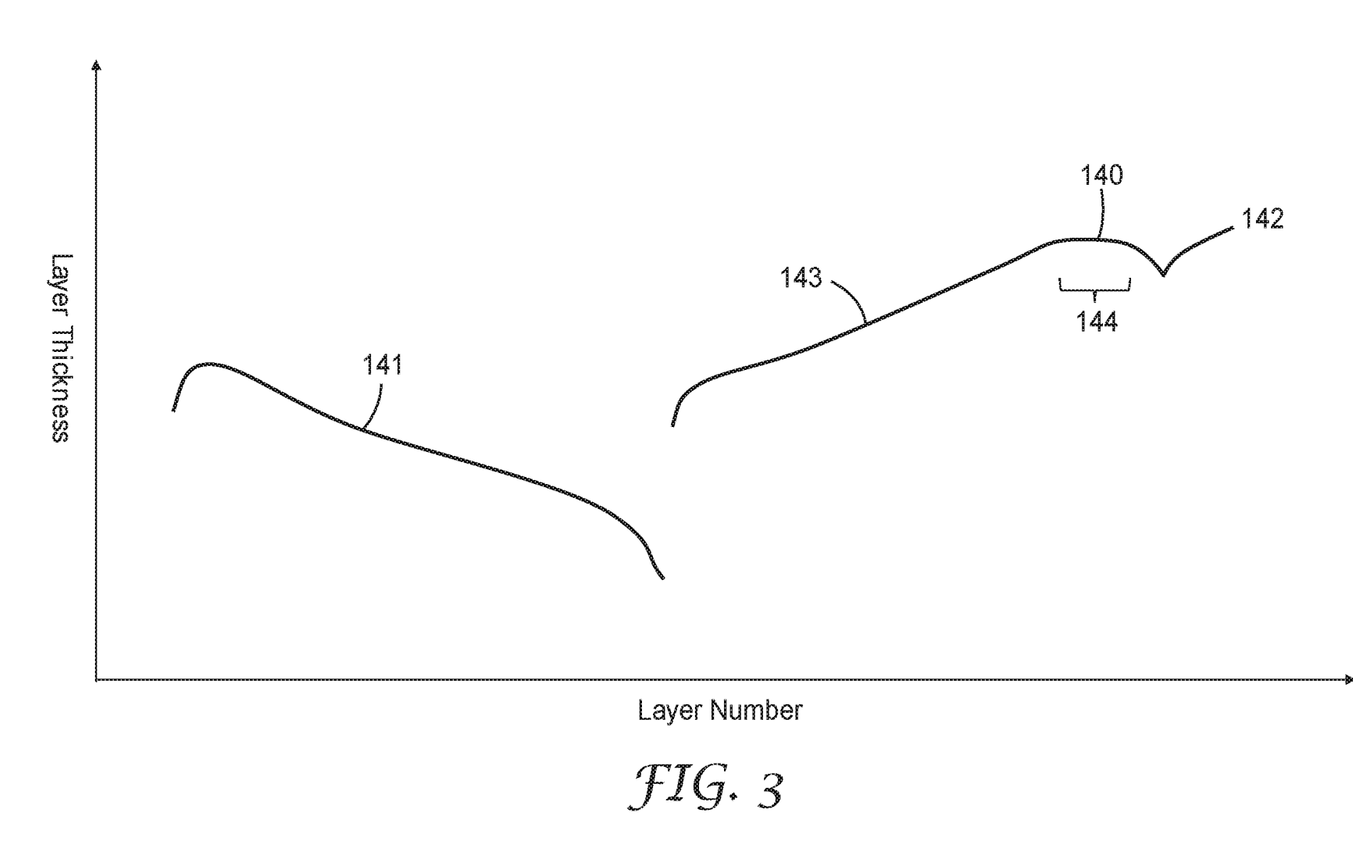
FIG. 3 is a schematic illustration of an optical thickness profile of an optical film.

FIG. 3 is a schematic illustration of an optical thickness profile of adjacent layer pair optical thicknesses of an optical film according to some embodiments. The optical thickness profile is defined by the optical thickness of disjoint pairs (optical repeat units) of adjacent first and second layers 101 and 102 in the plurality of alternating polymeric first and second layers 101 and 102 as the average optical thickness of each layer pair as a function of layer pair number where the layer pair number refers to a sequential numbering of pairs of the alternating first and second layers included in the film. The different layer pairs are disjoint (i.e., the different layer pairs do not include a common layer). Each layer pair includes one first layer and one second layer with no additional first layer or second layer between the one first layer and the one second layer (e.g., the one first layer and the one second layer may be immediately adjacent). The optical thickness of each layer is the average thickness of the layer times an in-plane refractive index of the layer. In the illustrated embodiment, the optical film includes first and second packets 141 and 143 where each packet has a substantially continuously varying layer pair optical thickness. An optically thick (e.g., an optical thickness of at least 2 microns) protective boundary layer may optionally be disposed between the first and second packets 141 and 143. The optical film has a layer pair 140 having a maximum optical thickness Tm (no other layer pair in the plurality of alternating first and second layers 101 and 102 has a larger optical thickness). In some embodiments, the optical thickness profile increases from an outermost layer pair 142 in the plurality of alternating polymeric first and second layers 101 and 102 to a layer pair 140 having a maximum optical thickness Tm and decreases from the layer pair 140 having the maximum optical thickness Tm in a direction away from the outermost layer pair 142. In some embodiments, the maximum optical thickness Tm is at least 15 nm greater than the optical thickness of the outermost layer pair 142. In some embodiments, the maximum optical thickness Tm is in a range of about 330 nm to about 480 nm or in a range of about 360 nm to about 460 nm.

In some embodiments, the optical film includes a substantial number of contiguous layer pairs 144 having an optical thickness close to the maximum optical thickness Tm. In some embodiments, the plurality of alternating polymeric first and second layers 101 and 102 includes at least 20 disjoint layer pairs (e.g., layer pairs 144) having an optical thickness within about 20 nm, or within about 15 nm, or within about 12 nm, or within about 10 nm, or within about 8 nm, or within about 7 nm, or within about 6 nm of the maximum optical thickness Tm. In some embodiments, the plurality of alternating first and second layers 101 and 102 includes at least 25 disjoint layer pairs having an optical thickness within about 25 nm, or within about 20 nm, or within about 15 nm, or within about 12 nm, or within about 10 nm, or within about 8 nm, or within about 7 nm, or within about 6 nm of the maximum optical thickness Tm. In some embodiments, the plurality of alternating first and second layers 101 and 102 includes at least 30 disjoint layer pairs having an optical thickness within about 30 nm, or within about 25 nm, or within about 20 nm, or within about 15 nm, or within about 12 nm, or within about 10 nm, or within about 8 nm, or within about 7 nm, or within about 6 nm of the maximum optical thickness Tm.

In some embodiments, a pair of adjacent first and second layers in the plurality of alternating polymeric first and second layers has a maximum optical thickness (e.g. layer pair 140), and the plurality of alternating polymeric first and second layers includes at least 20 disjoint layer pairs (e.g., layer pairs 144) having an optical thickness within about 20 nm, or within about 15 nm, or within about 12 nm, or within about 10 nm, or within about 8 nm, or within about 7 nm, or within about 6 nm of the maximum optical thickness. In some embodiments, a pair of adjacent first and second layers in the plurality of alternating polymeric first and second layers has a maximum optical thickness (e.g. layer pair 140), and the plurality of alternating polymeric first and second layers includes at least 25 disjoint layer pairs (e.g., layer pairs 144) having an optical thickness within about 25 nm, or within about 20 nm, or within about 15 nm, or within about 12 nm, or within about 10 nm, or within about 8 nm, or within about 7 nm, or within about 6 nm of the maximum optical thickness. In some embodiments, a pair of adjacent first and second layers in the plurality of alternating polymeric first and second layers has a maximum optical thickness (e.g. layer pair 140), and the plurality of alternating polymeric first and second layers includes at least 30 disjoint layer pairs (e.g., layer pairs 144) having an optical thickness within about 30 nm, or within about 25 nm, or within about 20 nm, or within about 15 nm, or within about 12 nm, or within about 10 nm, or within about 8 nm, or within about 7 nm, or within about 6 nm of the maximum optical thickness. In some embodiments, the optical thickness profile may be different from that illustrated in FIG. 3. For example, the optical thickness may decrease non-monotonically from the layer pair 140 having the maximum optical thickness to the outermost layer pair 142, or may have a nearly constant optical thickness from the layer pair 140 to the outermost layer pair 142. In some embodiments, multiple layer pairs may have a same maximum optical thickness. In this case, any of these layer pairs may be taken to be the layer pair 140 having the maximum optical thickness (e.g., the layer pair in these pairs that is farthest from the outermost layer pair 142).

Figure 4:
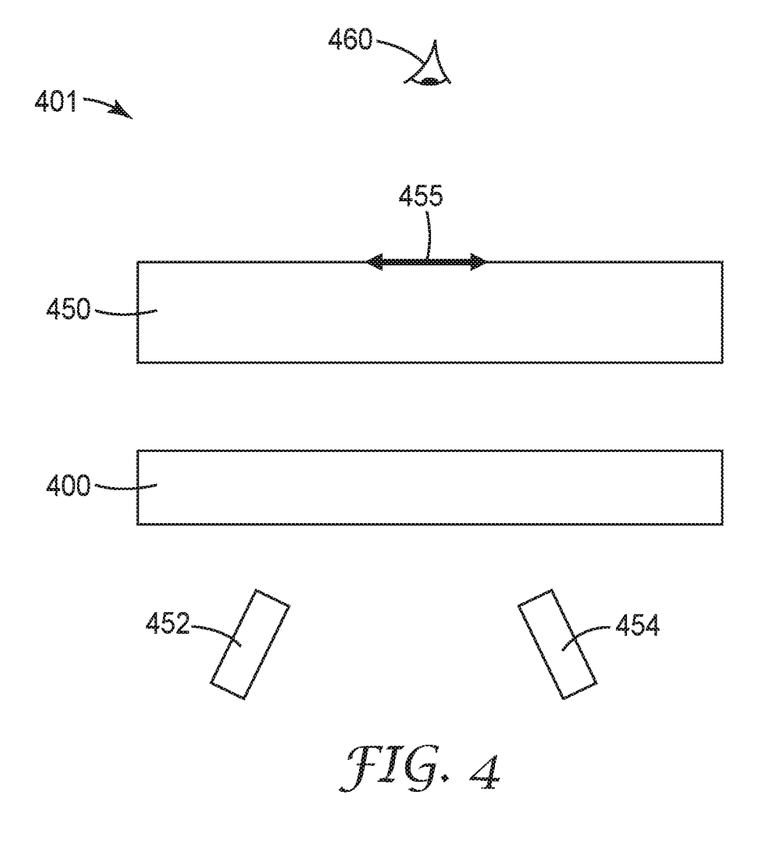
FIG. 4 is a schematic cross-sectional view of a display including an optical film.

In some embodiments, a display including any of the optical films described elsewhere herein is provided. FIG. 4 is a schematic illustration of a display 401 including an optical film 400; a display panel 450 for displaying a visible image 455 to a viewer 460 in the first wavelength range (e.g., wavelength range 122); and at least one of an infrared sensor 454 or an infrared light source 452 disposed adjacent the optical film 400 opposite the display panel 450. The display panel 450 is disposed between the optical film 400 and the viewer 460. In the illustrated embodiment, the infrared sensor 454 and the infrared light source 452 are included. In other embodiments, one of the infrared sensor 454 and the infrared light source 452 may be omitted. The optical film 400 may be a mirror film.

In some embodiments, a display 401 includes a display panel 450 for displaying a visible image 455 to a viewer 460 in a first wavelength range extending at least from about 400 nm to about 700 nm; an infrared light source 452 for emitting light at an infrared wavelength (e.g., infrared wavelength 127 depicted in FIG. 2) greater than the first wavelength range through the display panel 450 toward the viewer 460; and a mirror film 400 disposed between the display panel 450 and the infrared light source 452, such that for substantially normally incident light and for each of orthogonal first and second polarization states: for each wavelength in the first wavelength range, the mirror film 400 reflects at least 90% of light; at the infrared wavelength, the mirror film transmits at least 70% of light; and at a first wavelength (e.g., wavelength 123 depicted in FIG. 2) disposed between the first wavelength range and the infrared wavelength, the mirror film transmits between 40% and 60% of light, or between 40% and 50% of light. In some embodiments, the first wavelength of within about 60 nm, or about 50 nm, or about 40 nm, or about 30 nm, or about 20 nm of the infrared wavelength.

Figure 5:
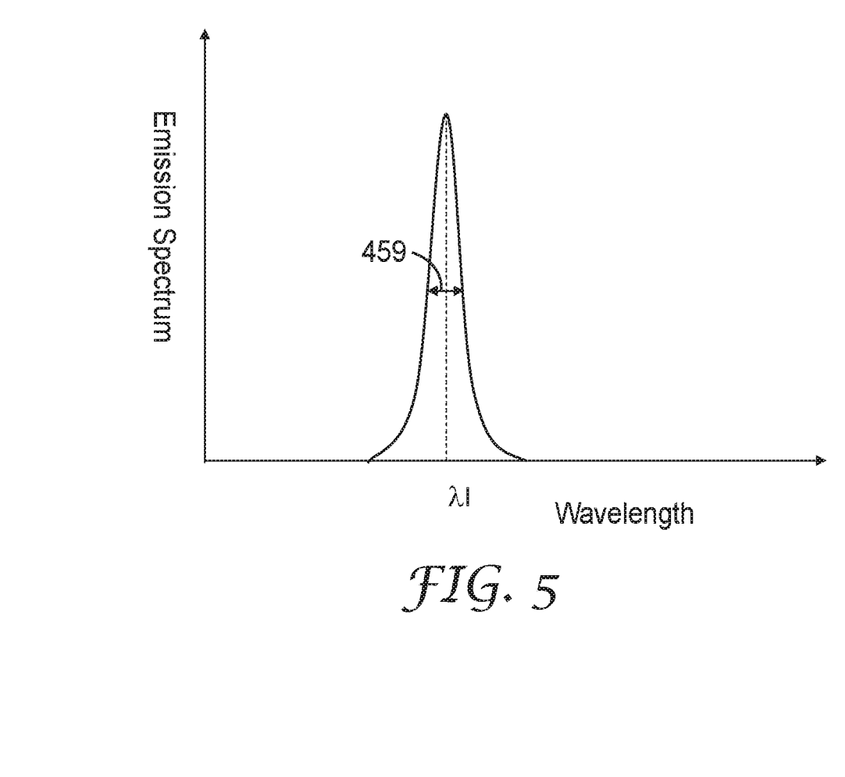
FIG. 5 is a schematic illustration of an emission spectrum of an infrared light source.

In some embodiments, the infrared light source 452 is or includes a laser diode or a light emitting diode (LED). In some embodiments, the infrared light source 452 has an emission spectrum having a peak at the infrared wavelength and having a full width at half maximum of no more than about 50 nm, or no more than about 40 nm, or no more than about 30 nm, or no more than about 20 nm, or no more than about 10 nm. FIG. 5 is a schematic illustration of an emission spectrum of an infrared light source 452 having a peak at a wavelength λI corresponding to the infrared wavelength and a having a full width at half maximum of 459. In some embodiments, the infrared wavelength λI is about 850 nm or about 940 nm.

The mirror film 400 may be any of the optical films described elsewhere herein. In some embodiments, an optical transmittance of the mirror film for substantially normally incident light includes a band edge separating the first wavelength range and a second wavelength range where the second wavelength range extends at least from about 950 nm to about 1300 nm, such that for substantially normally incident light in air: an optical reflectance of the mirror film is greater than about 95% for each wavelength in the first wavelength range; an average optical transmittance of the mirror film is greater than about 80% in the second wavelength range; and a difference between maximum and minimum values of the optical transmittance of the mirror film in the second wavelength range is less than about 25%. In some embodiments, a best linear fit to the band edge correlating the optical transmittance to wavelength at least across a wavelength range where the optical transmittance increases from about 10% to about 70%, or to about 75%, or to about 80% has a slope that is greater than about 2%/nm, or greater than about 3%/nm, or greater than about 4%/nm, or greater than about 5%/nm. In some embodiments, the mirror film 400 includes a band edge region separating the first wavelength range from a second wavelength range, where the second wavelength range is at least 250 nm wide, and a difference between maximum and minimum values of the optical transmittance of the optical film in each of the first and second wavelength ranges is less than about 30%. In some embodiments, an optical transmittance of the mirror film 400 for substantially normally incident light within the band edge region increases monotonically at least from about 10% to about 70%, or at least from about 10% to about 75%, or at least from about 10% to about 80% with increasing wavelength.

EXAMPLES

Transmission/Reflection Spectra Test method

All spectral transmission or reflection properties were measured using a PerkinElmer, LAMBDA 950 (available from PerkinElmer, Waltham, Mass.) with wavelength range from 350 nm to 1500 nm.

Comparative Example C1 (ESR-80v2)

Figure 6:
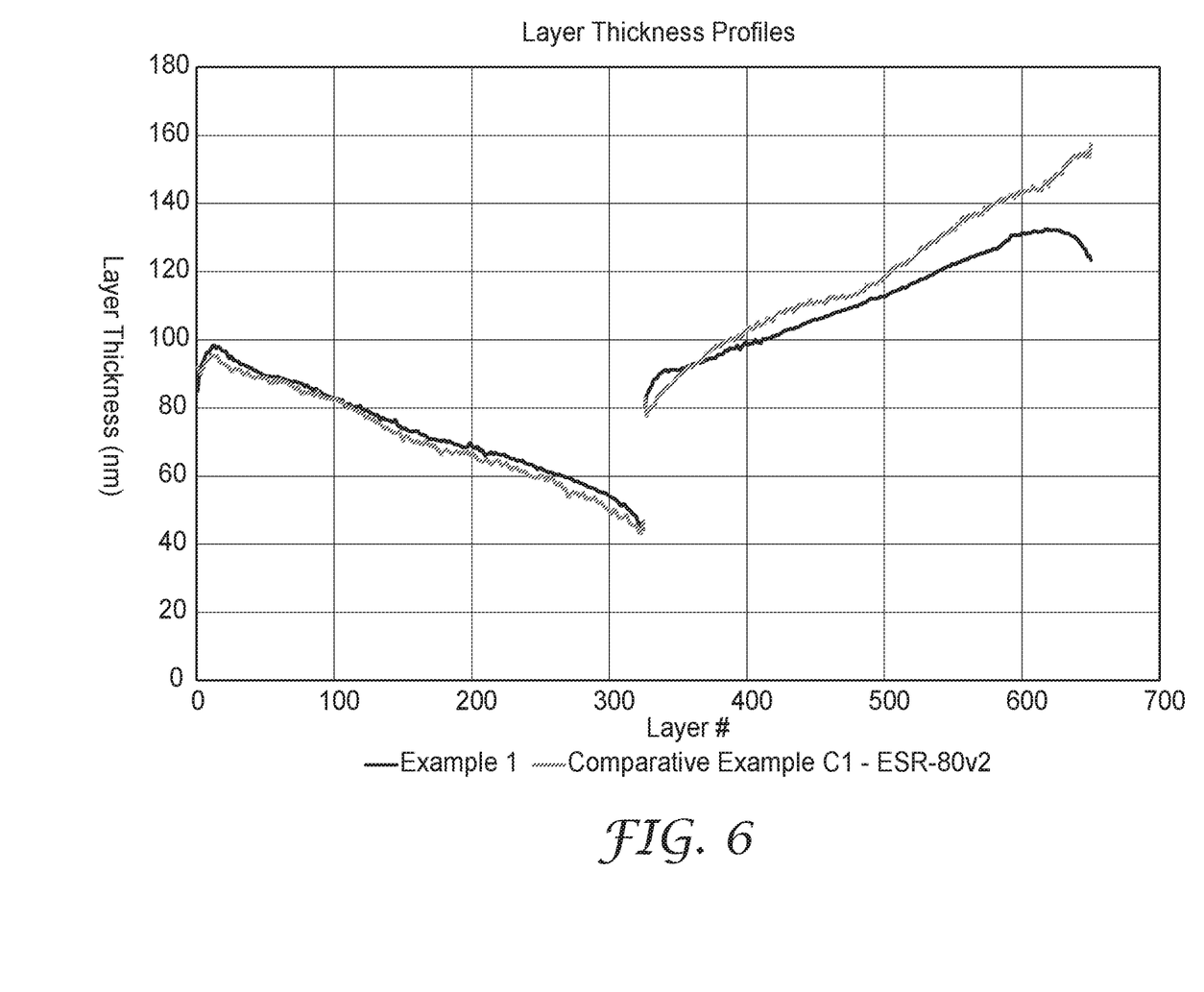
FIG. 6 are thickness profile plots determined by atomic force microscopy.
Figure 7:
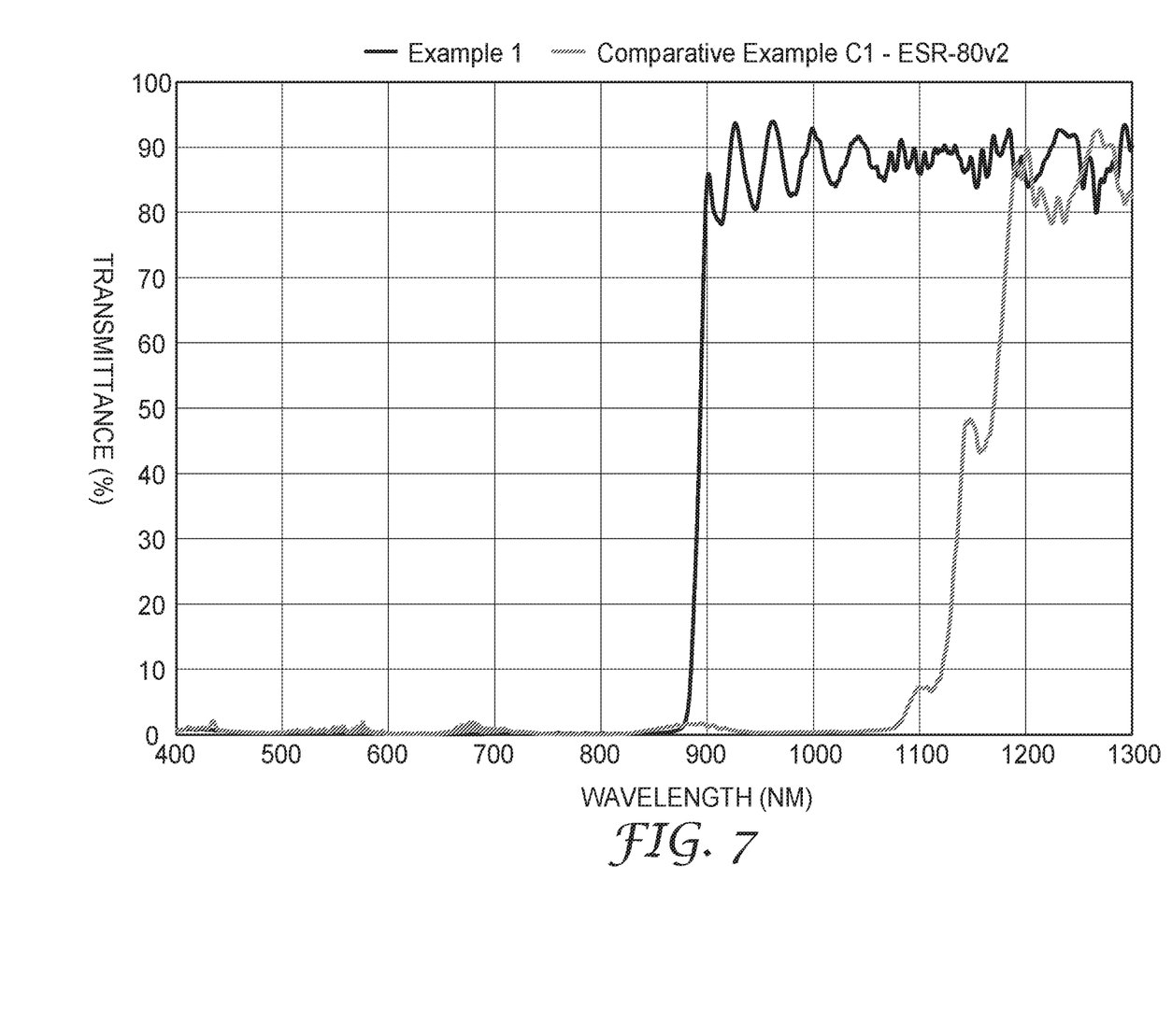
FIGS. 7-9 are transmission spectra for optical films.

A visible light mirror film was obtained from 3M Company (St. Paul, MN) under the trade name ESR-80v2. The film included alternating first and second optical layers, where the first layers were a polyethylene naphthalate (PEN) homopolymer (100 mol % naphthalene dicarboxylate with 100 mol % ethylene glycol), and the second layers were a poly(methyl methacrylate) or PMMA. The film included skin layers on the outer surfaces of the alternating first and second layers. The polymer used for the skin layers were formed of the same material used in the first layers. Including the skin layers, the optical film had 656 layers. The refractive indices of the alternating first and second optical layers were approximately the same as those reported in Example 1. The thickness profile of the alternating first and second layers was determined by atomic force microscopy (AFM) and is shown in FIG. 6. The average physical thickness of first and second optical layers in disjoint pairs of immediately adjacent first and second layers is shown in FIG. 6. The skin thicknesses were determined by AFM to be 6.1 and 5 microns. The transmission spectrum was determined and is shown in FIG. 7. The band edge slope was determined to be 1.11%/nm from a best linear fit to the band edge correlating the optical transmittance to wavelength across a wavelength range where the optical transmittance increased from about 10% to about 70%. The film had a physical thickness of approximately 84 microns as measured by AFM.

Comparative Example C2 (ESR2)

A visible light mirror film including alternating first and second optical layers was prepared by co-extrusion and biaxial orientation as described in U.S. Patent Publication US2001/0013668 (Neavin et al.), with exceptions as follows. The first optical layers were an ethylene naphthalate (PEN) homopolymer (100 mol % naphthalene dicarboxylate with 100 mol % ethylene glycol) having a Tg of 121-123 degrees centigrade. The second optical layers were a poly(methyl methacrylate) or PMMA. An example of PMMA is available from Arkema, Pasadena, TX, USA, and has a Tg of 100 degrees centigrade. Skin layers were formed on the outer surfaces of the alternating first and second layers. The polymer used for the skin layers were formed of the same material used in the first optical layers. The skin thicknesses were determined by AFM to be 3.1 and 3.6 microns. The film had a physical thickness of approximately 32 microns as measured by AFM. The refractive indices of the alternating first and second optical layers were approximately the same as those reported in Example 1.

The materials were fed from separate extruders to a multilayer coextrusion feedblock, in which they were assembled into alternating optical layers. The skin layers were added to the construction in a manifold specific to that purpose, resulting in a final construction having 269 layers. The multilayer melt was then cast through a film die onto a chill roll, in the conventional manner for polyester films, upon which it was quenched. The cast web was then stretched in a commercial scale biaxial tenter at temperatures and draw profiles similar to those described in U.S. Patent Publication US2001/001366.

Figure 8:
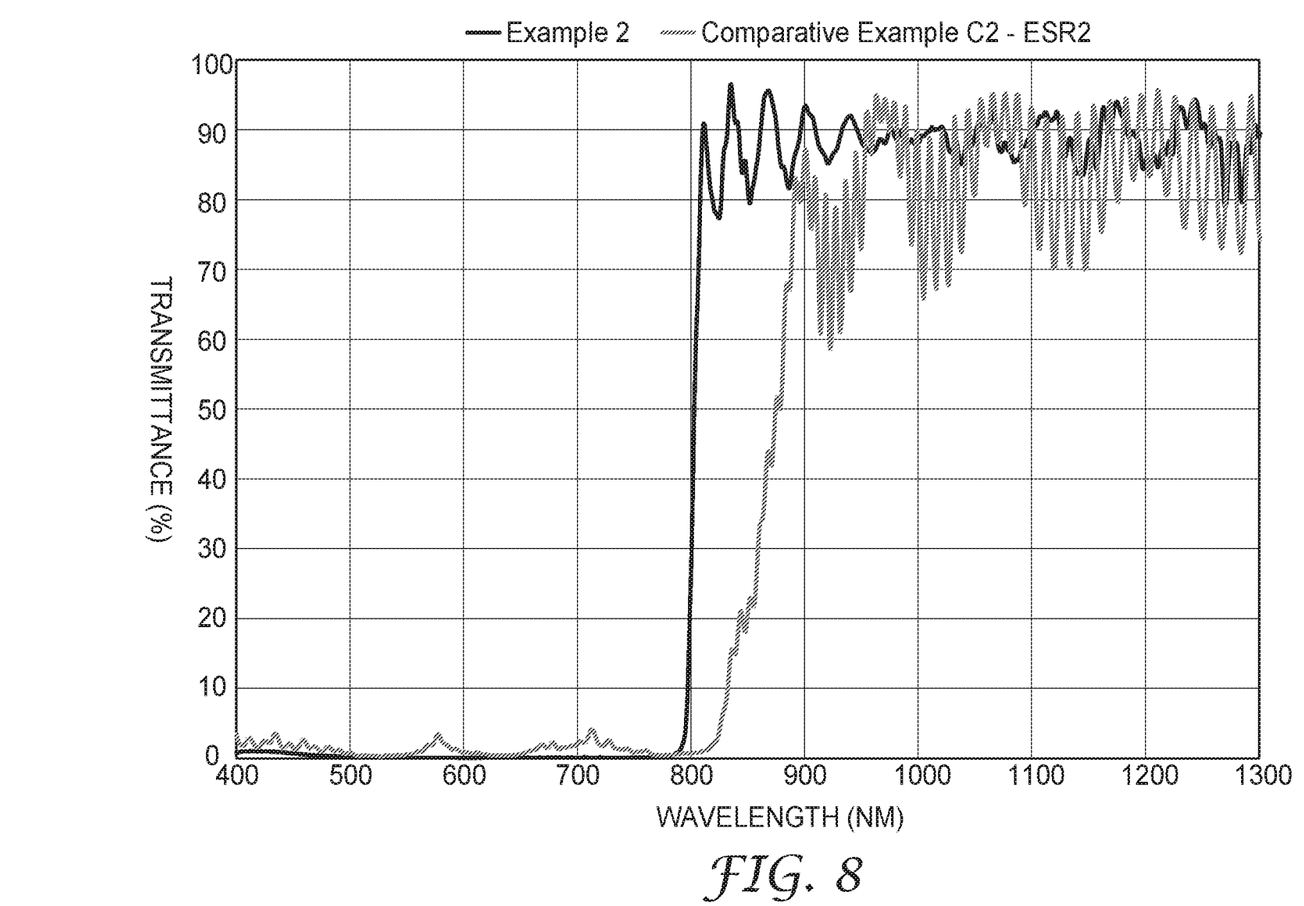

The transmission spectrum was determined and is shown in FIG. 8. The band edge slope was determined to be 1.02%/nm from a best linear fit to the band edge correlating the optical transmittance to wavelength across a wavelength range where the optical transmittance increased from about 10% to about 70%.

Example 1

An optical film (visible light mirror film) including alternating first and second optical layers and including skin layers was made as generally described for Comparative Example 2 except that the thickness profile and skin layer thickness was altered. The thickness profile of the alternating first and second layers as determined by AFM is shown in FIG. 6. The thickness of the skin layer that faced the chill roll during the processing of the film was measured to be 7.13 microns and the opposite skin layer had a measured thickness of 7.20 microns. The transmission spectrum was determined and is shown in FIG. 7. The band edge slope was determined to be 5.17%/nm from a best linear fit to the band edge correlating the optical transmittance to wavelength across a wavelength range where the optical transmittance increased from about 10% to about 70%.

The refractive indices of the first layers was determined by measuring the refractive indices of the skin layer, since the skin layers were formed of the same material and oriented under the conditions as the first layers. A Metricon 2010/M prism coupler at a wavelength of 633 nm was used to determine the refractive indices which were found to be n1x=1.737, n1y=1.763, and n1z=1.496. The refractive index of the second layers were determined as the refractive indices at 633 nm of the isotropic PMMA material used in the second layers. The result was n2x≈n2y n2z≈1.495.

The film was measured for physical thickness by a capacitance gauge to be approximately 77 microns as measured using the Ono-Sokki DG-925 Micrometer.

Example 2

An optical film including alternating first and second layers and including skin layers was made as generally described for Example 1 except that the skin layer thickness was altered, and the layer thickness profile was altered to shift the band edge to shorter wavelengths. The skin thicknesses were determined by AFM to be 5.1 and 6.7 microns. The film had a physical thickness of approximately 69 microns as measured by AFM. The transmission spectrum was determined and is shown in FIG. 8. The band edge slope was determined to be 6.25%/nm from a best linear fit to the band edge correlating the optical transmittance to wavelength across a wavelength range where the optical transmittance increased from about 10% to about 70%. The refractive indices of the alternating first and second layers were approximately the same as those reported in Example 1.

Example 3

An optical film including alternating first and second layers and including skin layers was made as generally described for Example 1 except that the number of alternating first and second layers, the thickness profile, and skin layer thickness was altered. Including the skin layers, the optical film had 536 layers. The thickness of the skin layer that faced the chill roll during the processing of the film was measured to be 3.73 microns and the opposite skin layer had a measured thickness of 4.43 microns. The film had a physical thickness of approximately 59 microns as measured by AFM. The layer thickness profile was chosen to produce the transmission spectrum shown in FIG. 9. The band edge slope was determined to be 6.30%/nm from a best linear fit to the band edge correlating the optical transmittance to wavelength across a wavelength range where the optical transmittance increased from 8.7% to 71.9%, and 5.84%/nm from a best linear fit to the band edge correlating the optical transmittance to wavelength across a wavelength range where the optical transmittance increased from 8.7% to 75.1%. The refractive indices of the alternating first and second optical layers were approximately the same as those reported in Example 1.

Example 4

Figure 9:
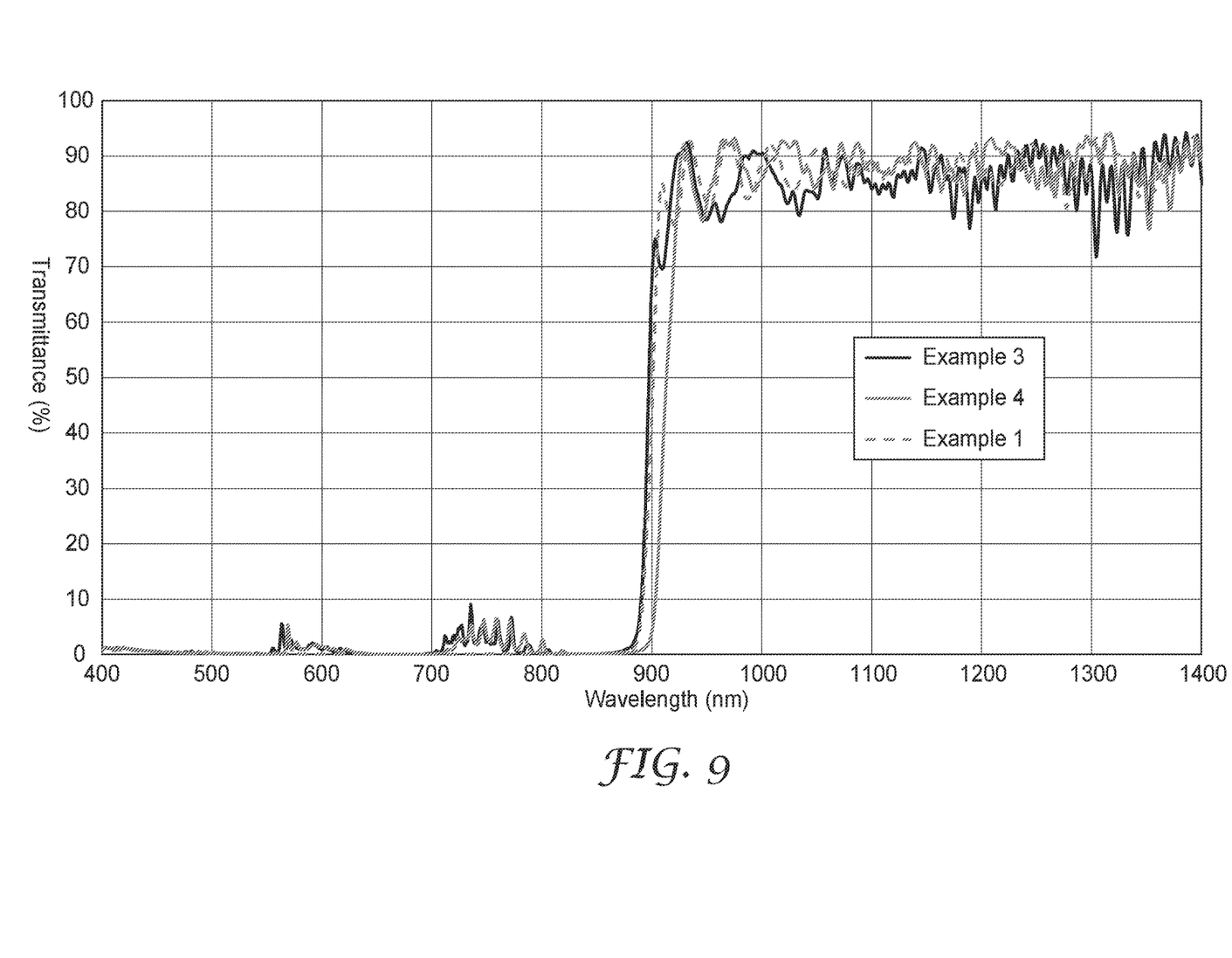

An optical film including alternating first and second layers and including skin layers was made as generally described for Example 4 except that the skin layer thickness was altered. The thickness of the skin layer that faced the chill roll during the processing of the film was measured to be 5.11 microns and the opposite skin layer had a measured thickness of 5.62 microns. The film had a physical thickness of approximately 61 microns as measured by AFM. The transmission spectrum was determined and is shown in FIG. 9. The band edge slope was determined to be 3.71%/nm from a best linear fit to the band edge correlating the optical transmittance to wavelength across a wavelength range where the optical transmittance increased from 9.8% to 71.2%, and 3.62%/nm from a best linear fit to the band edge correlating the optical transmittance to wavelength across a wavelength range where the optical transmittance increased from 9.8% to 81.5%. The refractive indices of the alternating first and second optical layers were approximately the same as those reported in Example 1.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" can be understood to mean within 10 percent of the specified quantity, but also includes exactly the specified quantity. For example, if it is not otherwise clear to one of ordinary skill in the art in the context in which it is used and described in the present description, a quantity having a value of about 1, means that the quantity has a value between 0.9 and 1.1, but also includes a value of exactly 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising a plurality of alternating polymeric first and second layers disposed on a skin layer, each of the first and second layers having an average thickness less than about 250 nm, the skin layer having an average thickness greater than about 2 microns, an optical transmittance of the optical film for substantially normally incident light comprising a band edge separating first and second wavelength ranges, the first wavelength range extending at least from about 400 nm to about 700 nm, the second wavelength range extending at least from about 950 nm to about 1300 nm, such that for substantially normally incident light in air:

an optical reflectance of the optical film is greater than about 95% for each wavelength in the first wavelength range;

an average optical transmittance of the optical film is greater than about 80% in the second wavelength range; and a difference between maximum and minimum values of the optical transmittance of the optical film in the second wavelength range is less than about 25%; and a best linear fit to the band edge correlating the optical transmittance to wavelength at least across a wavelength range where the optical transmittance increases from about 10% to about 70% has a slope that is greater than about 2%/nm, wherein the first and second layers and the skin layer are formed integrally with one another, wherein in planes of the first and second layers, the first and second layers having respective indices of refraction: n1x and n2x along a first polarization state, n1y and n2y along a second polarization state orthogonal to the first polarization state, and n1z and n2z along a z-axis orthogonal to the first and second polarization states, such that for at least one wavelength in at least one of the first and second wavelength ranges:

each of n1x and n1y is greater than n1z by at least 0.2;

a difference between n1x and n1y is less than about 0.04;

a maximum difference between n2x, n2y and n2z is less than about 0.01; and a difference between n1x and n2x is greater than about 0.2.

2. The optical film of claim 1, wherein the optical transmittance of the optical film for substantially normally incident light increases monotonically at least from about 10% to about 70% with increasing wavelength.

3. The optical film of claim 1, wherein the slope of the best linear fit is greater than about 3%/nm.

4. The optical film of claim 1, wherein a pair of adjacent first and second layers in the plurality of alternating polymeric first and second layers has a maximum optical thickness, the plurality of alternating polymeric first and second layers comprising at least 20 disjoint layer pairs having an optical thickness within about 20 nm of the maximum optical thickness.

5. An optical film comprising a plurality of alternating polymeric first and second layers numbering between 50 and 800, each first and second layer having an average thickness less than about 500 nm, an optical transmittance of the optical film for substantially normally incident light comprising a band edge region separating first and second wavelength ranges, each range at least 250 nm wide, a difference between maximum and minimum values of the optical transmittance of the optical film in each wavelength range less than about 30%, in planes of the first and second layers, the first and second layers having respective indices of refraction: n1x and n2x along a first polarization state, n1y and n2y along a second polarization state orthogonal to the first polarization state, and n1z and n2z along a z-axis orthogonal to the first and second polarization states, such that for at least one wavelength in at least one of the first and second wavelength ranges:
- each of n1x and n1y is greater than n1z by at least 0.2;
- a difference between n1x and n1y is less than about 0.04;
- a maximum difference between n2x, n2y and n2z is less than about 0.01; and
- a difference between n1x and n2x is greater than about 0.2, wherein the optical transmittance of the optical film for substantially normally incident light within the band edge region increases monotonically at least from about 10% to about 70% with increasing wavelength.

6. The optical film of claim 5, wherein a best linear fit to the band edge correlating the optical transmittance to wavelength at least across a wavelength range where the optical transmittance increases from about 10% to about 70% has a slope that is greater than about 2%/nm.

7. The optical film of claim 5, wherein the first wavelength range extends at least from about 400 nm to about 700 nm, and the second wavelength range extends at least from about 950 nm to about 1300 nm.

8. The optical film of claim 5, wherein the difference between maximum and minimum values of the optical transmittance of the optical film in each wavelength range less than about 25%.

9. The optical film of claim 5, wherein each first and second layer has an average thickness less than about 250 nm.

10. The optical film of claim 5, wherein a pair of adjacent first and second layers in the plurality of alternating polymeric first and second layers has a maximum optical thickness, the plurality of alternating polymeric first and second layers comprising at least 20 disjoint layer pairs having an optical thickness within about 20 nm of the maximum optical thickness.

* * * * *